United States Patent
Pettigrew et al.

(10) Patent No.: US 6,869,085 B2
(45) Date of Patent: Mar. 22, 2005

(54) DISPOSABLE SHOPPING CART HANDLE SANITARY COVER

(76) Inventors: Victoria I. Pettigrew, 18640 Castle Lake Dr., Morgan Hill, CA (US) 95037; Stephen H. Pettigrew, 18640 Castle Lake Dr., Morgan Hill, CA (US) 95037

( * ) Notice: Subject to any disclaimer, the term of this patent is extended or adjusted under 35 U.S.C. 154(b) by 0 days.

(21) Appl. No.: 09/994,387

(22) Filed: Nov. 26, 2001

(65) Prior Publication Data

US 2003/0155727 A1 Aug. 21, 2003

(51) Int. Cl.$^7$ .............................................. B62D 33/00
(52) U.S. Cl. ............................ 280/33.992; 280/33.991; 150/154
(58) Field of Search ...................... 280/33.992, 33.991, 280/DIG. 4, 33.993, 304.1, 321.3, 33.997; 150/104, 105, 107, 109, 100, 154, 151, 155; 16/114.1, 436, 431, DIG. 24, DIG. 25; 248/251, 252; 4/608, 609; 283/81

(56) References Cited

U.S. PATENT DOCUMENTS

| | | | | |
|---|---|---|---|---|
| 3,005,742 A | * | 10/1961 | Kennedy, Jr. | 156/187 |
| 3,717,358 A | * | 2/1973 | Mills, Jr. | 280/33.991 |
| 3,866,649 A | * | 2/1975 | Bringmann | 280/33.992 |
| 4,373,718 A | * | 2/1983 | Schmidt | 473/538 |
| 4,567,091 A | * | 1/1986 | Spector | 428/222 |
| 4,765,856 A | * | 8/1988 | Doubt | 156/212 |
| 4,805,937 A | * | 2/1989 | Boucher et al. | 280/33.992 |
| 4,844,248 A | * | 7/1989 | Forberg et al. | 150/154 |
| 4,881,746 A | * | 11/1989 | Andreesen | 280/33.992 |
| 4,955,914 A | * | 9/1990 | Caniglia et al. | 606/235 |
| 4,981,737 A | * | 1/1991 | Rico | 428/41.7 |
| 5,215,319 A | | 6/1993 | Farris | 280/33.992 |
| 5,348,360 A | * | 9/1994 | Mencarelli et al. | 16/421 |
| 5,429,377 A | | 7/1995 | Duer | 280/33.992 |
| 5,470,087 A | * | 11/1995 | Mainard et al. | 280/33.992 |
| 5,715,571 A | * | 2/1998 | Fasano | 280/33.992 |
| 5,722,672 A | * | 3/1998 | Frederick | 280/33.992 |
| 5,820,142 A | | 10/1998 | Duer | 280/33.992 |
| 5,953,790 A | | 9/1999 | Auxier | 16/116 R |
| 6,065,764 A | | 5/2000 | Moseley | 280/33.992 |
| 6,361,079 B1 | * | 3/2002 | Kirkman | 283/81 |
| 6,449,794 B1 | * | 9/2002 | Jaffri | 424/407 |
| 6,488,292 B2 | * | 12/2002 | O'Quin | 280/33.991 |
| 6,543,794 B1 | * | 4/2003 | Tyree | 280/33.992 |

* cited by examiner

*Primary Examiner*—Christopher P. Ellis
*Assistant Examiner*—Hau Phan
(74) *Attorney, Agent, or Firm*—Zilka-Kotab, PC

(57) ABSTRACT

A cart grip sanitary cover is provided having multiple layers each with a top face, a bottom face, and a periphery formed therebetween. The bottom face of each layer has adhesive formed thereon for adhering to a top face of an adjacent layer therebeneath. The layers are stacked with a bottommost layer being attachable to a grip of a cart. In use, a topmost layer of the sanitary cover is removable for exposing another layer therebeneath for providing a sanitary surface to be gripped by a user.

22 Claims, 5 Drawing Sheets

US 6,869,085 B2

DISPOSABLE SHOPPING CART HANDLE SANITARY COVER

FIELD OF THE INVENTION

The present invention relates to shopping carts, and more particularly to shopping cart handle sanitary covers.

BACKGROUND OF THE INVENTION

Most of the public buys groceries at supermarkets. Probably just about everyone has grabbed one of the shopping carts at a supermarket and pushed it around while buying groceries and other items. The handle or grip of the shopping cart is tubular in shape and is normally made from a tubular metal or plastic product. Everyone else that has previously used the shopping cart grabs the grip at the same place while pushing the shopping cart.

Because the shopping carts will be used for years and because the shopping carts are either never cleaned or not cleaned in a sanitary manner, germs can be passed from one shopper to the next. In other words, a person using the shopping cart previously may have had a communicable disease. Shoppers using that same cart thereafter will be grabbing the same shopping cart grip in the same manner as the person who had the communicable disease.

Young children and infants are especially at risk as they are placed in the seat of the shopping cart where they inevitably put their mouths on the grip or put their hands in their mouths after having them on the grip. As medical science tells us, many diseases are susceptible to being transmitted by hand contact, such as staff and strep bacteria and numerous flu viruses.

In the past, the only feasible thing a shopper could do is to bring something to wipe off the grip of the shopping cart prior to use.

DISCLOSURE OF THE INVENTION

A cart grip sanitary cover is provided having multiple layers each with a top face, a bottom face, and a periphery formed therebetween. The bottom face of each layer has adhesive formed thereon for adhering to a top face of an adjacent layer therebeneath. The layers are stacked with a bottommost layer being attachable to a grip of a cart. In use, a topmost layer of the sanitary cover is removable for exposing another layer therebeneath for providing a sanitary surface to be gripped by a user.

In one embodiment, the layers may each be flexible and formed of an elastomeric material (i.e. plastic, rubber, etc.). As an option, the layers of the sanitary cover may be stacked so that the peripheries thereof are in alignment.

In another embodiment, the layers of the sanitary cover may each have a rectangular configuration. Further, the layers of the sanitary cover may each have an area substantially similar to an area of the grip of the cart. Still yet, the layers of the sanitary cover may each have a substantially similar shape and size.

In still another embodiment, a non-adhesive covering may be positioned on the bottom face of the bottommost layer of the sanitary cover for protecting the adhesive of the bottommost layer. Such non-adhesive covering may be removable for attachment of the adhesive of the bottommost layer of the sanitary cover to the grip of the cart.

In still yet another embodiment, a dispensing container may be provided for storing a plurality of the sanitary covers. Such dispensing container may include an opening for dispensing the sanitary covers therefrom.

As an option, the cart may include a shopping cart, or any other cart-like device with a grip.

A method is also provided for affording a sanitary surface on a grip of a cart. Initially, a sanitary cover similar to that described hereinabove is attached to a grip of a cart. Next, a topmost layer of the sanitary cover is removed for exposing another layer therebeneath for providing a sanitary surface for being gripped by a user.

In another embodiment, a cart grip sanitary cover formed of a single layer is provided with a top face, a bottom face, and a periphery formed therebetween. The bottom face of the sanitary cover has adhesive formed thereon. Further, a non-adhesive covering is positioned on the bottom face of the sanitary cover for protecting the adhesive. Such non-adhesive covering is adapted for being removed for attachment of the adhesive to a grip of a cart. For providing an optimal sanitary surface, the sanitary cover has an area substantially similar to an area of the grip of the cart.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
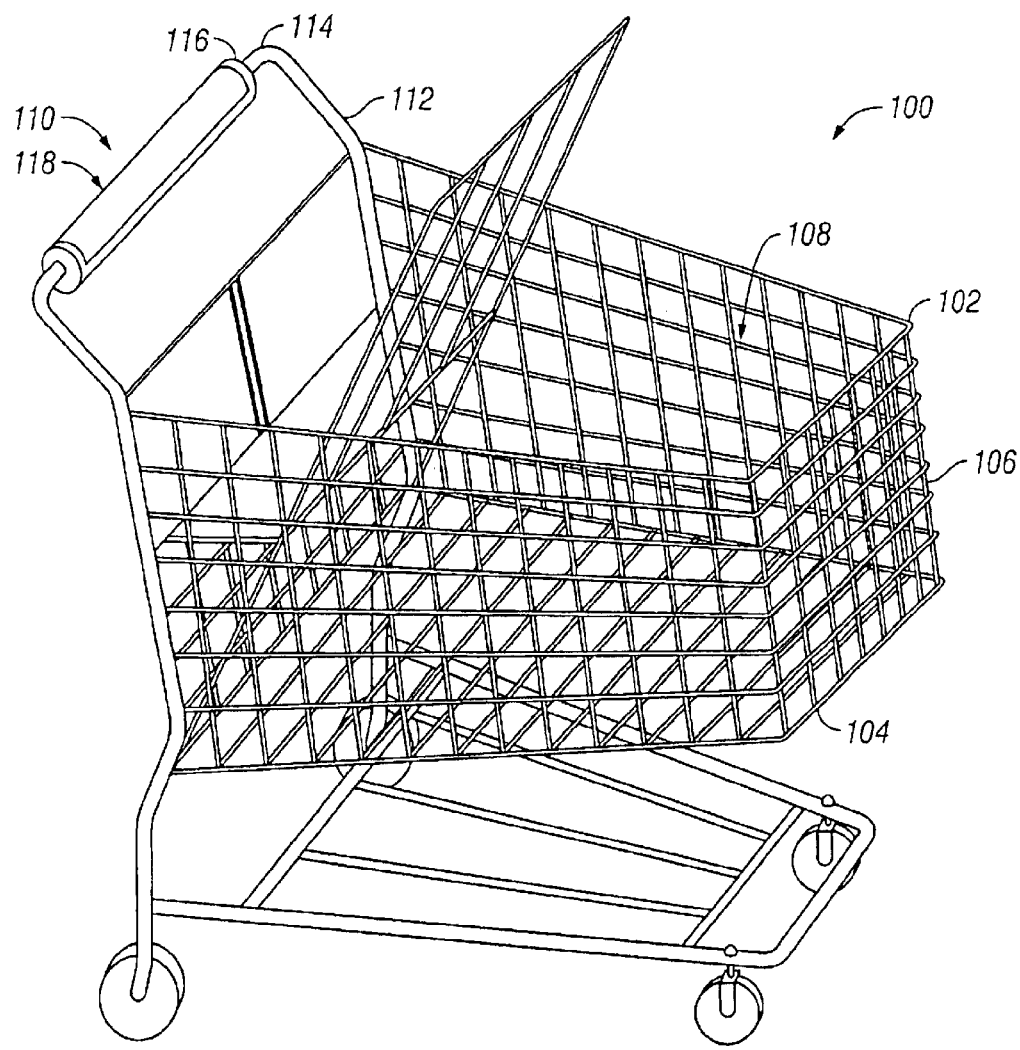
FIG. 1 is a perspective view of a shopping cart equipped with a sanitary cart grip cover, in accordance with one embodiment.

FIG. 1 illustrates a shopping cart 100 including a basket portion 102 having a bottom 104 and a plurality of sides 106 coupled thereto and extending upwardly therefrom. The basket portion 102 thus defines an interior space 108 for storing articles therein. Also included is a plurality of wheels coupled to the bottom 104 of the shopping cart 100 for transporting purposes.

The shopping cart 100 further includes a handle assembly 110 having a pair of substantially vertical posts 112 with inboard ends coupled to the sides 106 of the shopping cart 100 and extending upwardly and rearwardly therefrom. Associated therewith is a substantially horizontal handle 114 coupled to outboard ends of the posts 112. Such handle 114 further includes a grip 116 for being handled by a user to maneuver the shopping cart 100.

In one embodiment, the grip 116 includes a substantially tubular configuration and is constructed from a plastic material. In various other embodiments, the grip 116 may be constructed from a separate or integral metallic or elastomeric piece, or any other material with any desired type of configuration that is capable of being gripped by a user.

While a shopping cart 100 is specifically described, it should be noted that the principles set forth herein may be applied in the context of any cart-like device. For example, an airport luggage cart, any cart used by multiple users, or any other cart-like device may be considered within the scope of the present invention.

Figure 2:
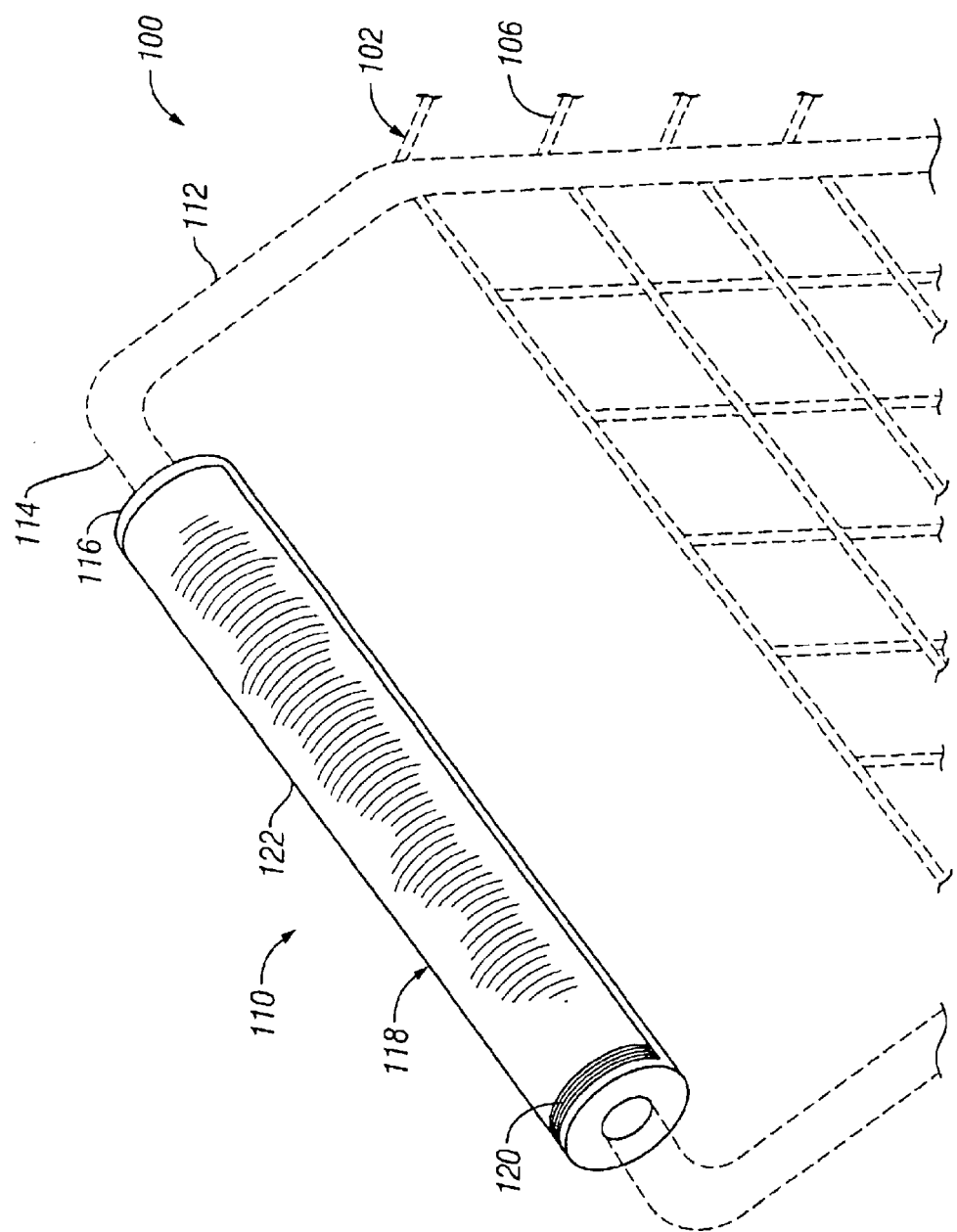
FIG. 2 is a close-up perspective view of the sanitary cart grip cover of FIG. 1.
Figure 3:
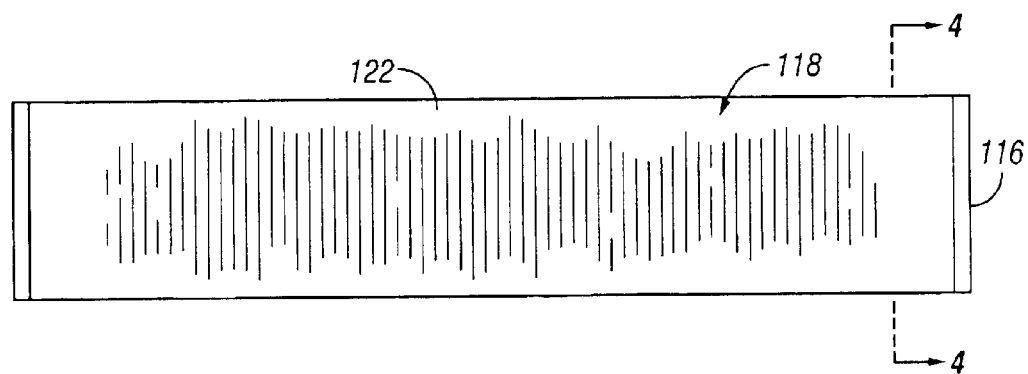
FIG. 3 is a top plan view of the sanitary cart grip cover of FIG. 1.

As shown in FIG. 1 and more particularly in FIGS. 2 and 3, also included is a cart grip sanitary cover 118 having multiple layers 120 each with a top face, a bottom face, and a periphery formed therebetween. The layers 120 are stacked one on top of another with a bottommost layer 121 being attached to the grip 116 of the cart 100. In use, a topmost layer 122 of the sanitary cover 118 is removable for exposing another layer 120 therebeneath for providing a sanitary surface for being gripped by a user. Thus, each user of the cart 100 is provided with a new sanitary surface to grip 116 during use.

Figure 4:
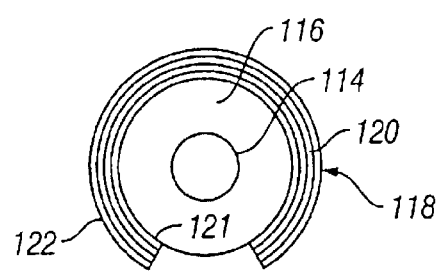
FIG. 4 illustrates a cross-sectional view of the cart grip sanitary cover taken along line 4—4 of FIG. 3.

FIG. 4 illustrates a cross-sectional view of the cart grip sanitary cover 118 taken along line 4—4 of FIG. 3. As shown, the layers 120 of the sanitary cover 118 may be stacked so that the peripheries thereof are in alignment. Further, the layers 120 of the sanitary cover 118 may each have a substantially similar shape and size. Of course, the sizes and shapes may be altered per the desires of the user.

In one embodiment, each layer 120 may have a thickness of less than $\frac{1}{16}^{th}$ of an inch or, even more preferably, less than $\frac{1}{32}^{nd}$ or $\frac{1}{64}^{th}$ of an inch. By this design, any large number of layers 120 may be included without substantially augmenting the diameter of the grip 116.

Still yet, the layers 120 of the sanitary cover 118 may each have an outer surface area and length substantially similar to an area and length of the grip 116 of the cart 100, respectively, for providing optimal sanitary protection. In one embodiment, this similarity may range between 50%–150% of the area and length of the grip 116 of the cart 100. Of course, this design may be varied per the desires of the user.

As an option, antibacterial agents or other types of sanitizing substances may be used to lace the layers 120 of the sanitary cover 118. This feature may be used to further enhance the sanitary function of the sanitary cover 118.

Figure 5:
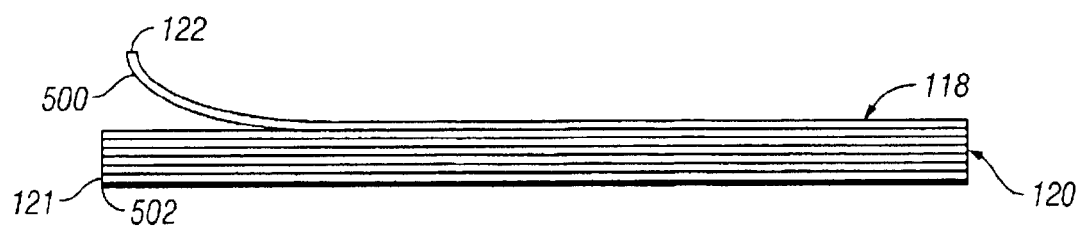
FIG. 5 illustrates a close-up side view of the sanitary cover prior to being attached to the grip of the cart, in accordance with one embodiment.

FIG. 5 illustrates a side view of the sanitary cover 118 prior to being attached to the grip 116 of the cart 100, in accordance with one embodiment. As shown in FIG. 5, each of the layers 120 is equipped with a smooth planar top face, a smooth planar bottom face, and a rectangular periphery formed therebetween. The bottom face of each layer 120 has adhesive 500 formed on an entire surface thereof for adhering to a top face of an adjacent layer 120.

A bottommost layer 121 has a non-adhesive covering 502 on the bottom face thereof for protecting the adhesive of the bottommost layer 121. As an option, the non-adhesive covering may have an area and a length substantially similar to an area and length of the remaining layers 120 set forth hereinabove. Moreover, the non-adhesive covering may be constructed of waxed paper or any other suitable material.

In use, a topmost layer 122 of the sanitary cover 118 is removable for exposing another layer 120 therebeneath for providing a sanitary surface for being gripped by a user.

Figure 6:
FIG. 6 illustrates an alternate embodiment sanitary cover including a single layer.

FIG. 6 illustrates an alternate embodiment 600 including a single layer 602. A bottom face of such single layer 602 has adhesive 606 formed thereon. Further, a non-adhesive covering 608 similar to the one of FIG. 5 is positioned on the bottom face of the present embodiment for protecting the adhesive 606. Such non-adhesive covering 608 is adapted for being removable for attachment of the adhesive 606 of the present embodiment to a grip 116 of the cart 100.

The present embodiment is thus adapted for being applied to a grip 116 of the cart 100 one by one, and disposed after use. In the alternative, the present embodiment may be applied one after another, leaving previous layers on the grip 116 of the cart 100.

Figure 7:
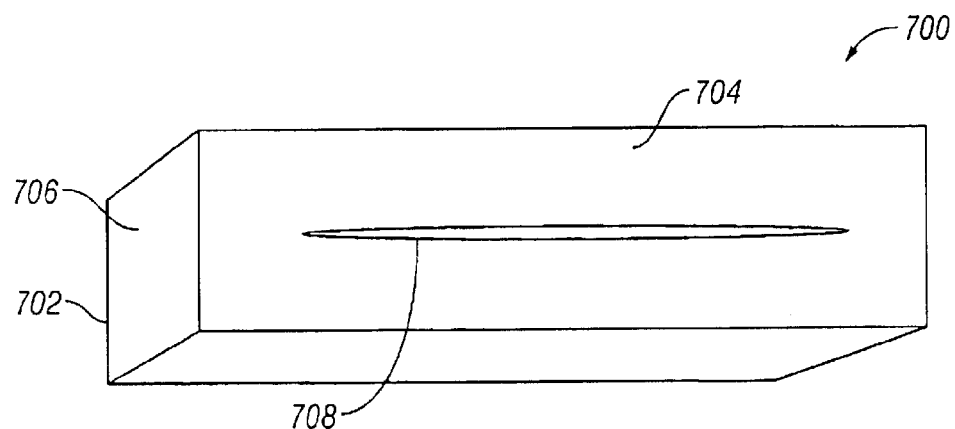
FIG. 7 illustrates an optional dispensing container that may be used to dispense any of the embodiments set forth hereinabove.

FIG. 7 illustrates an optional dispensing container 700 that may be used to dispense any of the embodiments set forth hereinabove. As shown, such dispensing container is equipped with a substantially rectangular configuration including a bottom face 702, a top face 704, and a plurality of side faces 706 formed therebetween. An interior space is thus defined for storing the sanitary covers 118 and/or 600. Further, the top face 704 of the dispensing container 700 includes an opening 708 for dispensing the sanitary covers 118 and/or 600 therefrom.

As such, the sanitary covers 118 and/or 600 are each dispensable from the dispensing container 700 and the associated non-adhesive covering is removable for attachment of the associated adhesive to the grip 116 of the cart 100.

Figure 8:
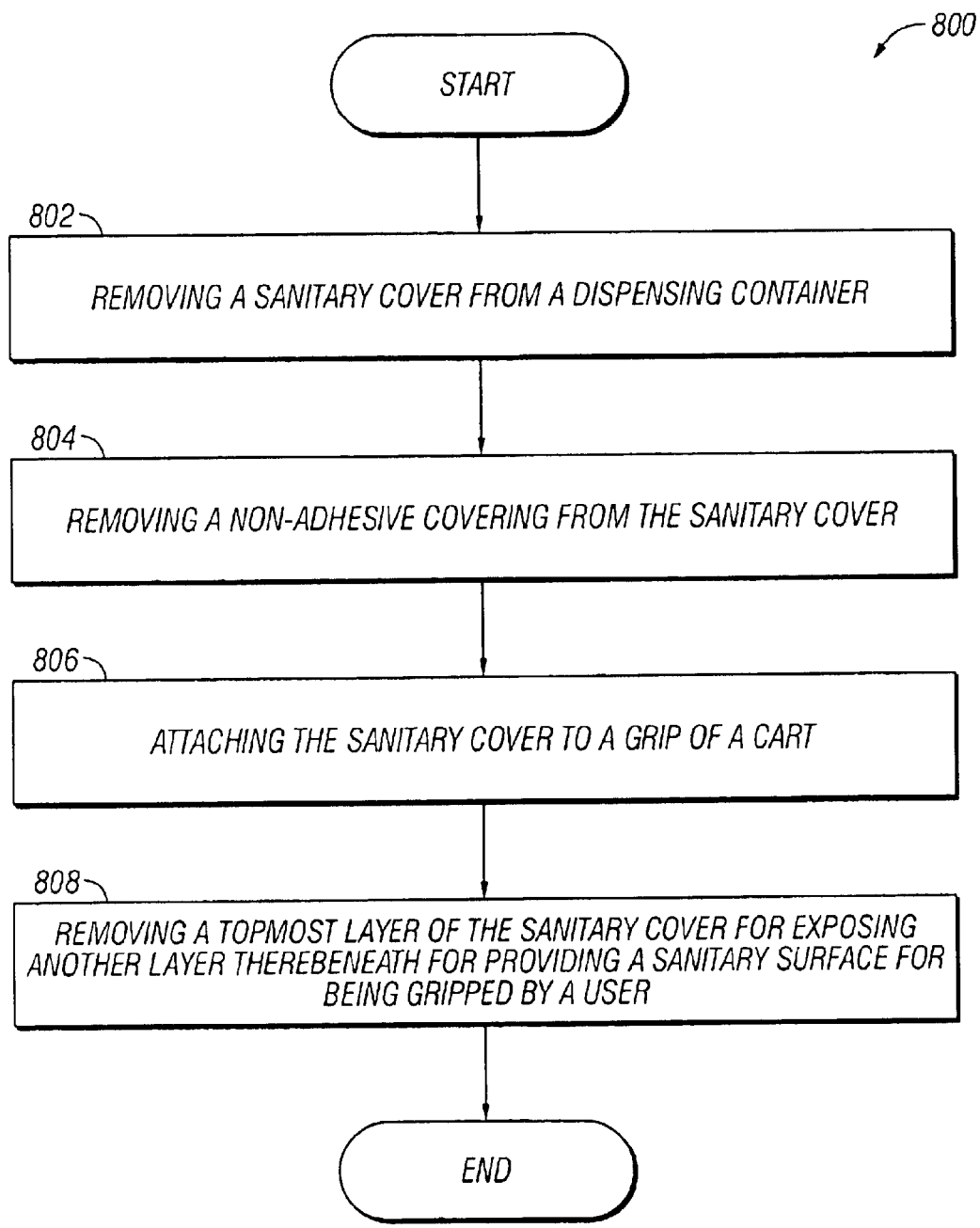
FIG. 8 illustrates a method for affording a sanitary surface on a grip of a cart, in accordance with one embodiment.

FIG. 8 illustrates a method 800 for affording a sanitary surface on a grip 116 of the cart 100, in accordance with one embodiment. Initially, in operation 802, a sanitary cover 118 similar to that described hereinabove is removed from a dispenser like that shown in FIG. 7 or any other type of dispenser. Next, in operation 804, the non-adhesive covering is removed for exposing an adhesive layer on a bottommost one of the layers 120 or, in the embodiment of a single layer, exposing an adhesive layer on the single layer.

Next, in operation 806, the sanitary cover 118 is attached to the grip 116 of the cart 100. This may be accomplished by wrapping the sanitary cover 118 around the grip 116 of the cart 100, and adhering it thereto.

Then, in the embodiment of FIG. 5 including multiple layers 120, a top layer may be removed at any time for exposing another layer therebeneath for providing a sanitary surface to be gripped by a user. See operation 808. As an option, a corner, side or edge of each layer 120 may be equipped with a tab or some other non-adhesive member that may be gripped by a user to facilitate the removal process. This operation may be continued until a bottommost layer 121 is exposed, after which a new sanitary cover 118 may be dispensed and applied to the grip 116 of the cart 100.

As will be understood from the above, the present invention provides a simple and effective means for covering or shielding the grips of carts 100 and the like to prevent contamination of the user of such carts 100 with disease or infectious residues left from previous users of the cart 100. Various improvements and alternative arrangements for the basic arrangement of such cover to be attached or placed over the cart grip are disclosed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A shopping cart grip sanitary cover system, comprising:
the shopping cart including a basket portion having a bottom and a plurality of sides coupled thereto and extending upwardly therefrom for defining an interior space for storing articles therein, a plurality of wheels coupled to the bottom of the shopping cart for transporting the shopping cart, and a handle assembly including a pair of substantially vertical posts with inboard ends coupled to the sides of the shopping cart and extending upwardly and rearwardly therefrom, a substantially horizontal handle coupled to outboard ends of the posts, wherein the handle includes a grip for being handled by a user to maneuver the shopping cart;
a plurality of sanitary covers each including multiple flexible elastomeric layers of a similar size and shape and each having a rectangular configuration with a smooth top face, a smooth bottom face, and a rectangular periphery formed therebetween, the bottom face of each layer having adhesive formed thereon for adhering to a top face of an adjacent layer, the layers being stacked with a bottommost layer having a non-adhesive covering on the bottom face thereof for protecting the adhesive of the bottommost layer; and
a dispensing container with a substantially rectangular configuration including a bottom face, a top face, and a plurality of side faces formed therebetween for defining an interior space for storing the sanitary covers, the top face of the dispensing container including an opening for dispensing the sanitary covers therefrom;
whereby the sanitary covers are each dispensable from the dispensing container and the non-adhesive covering is removable for attachment of the adhesive of the bottommost layer to the grip of the shopping cart, a topmost layer of each sanitary cover being removable utilizing a non-adhesive member coupled to an edge thereof for exposing another layer therebeneath for providing a sanitary surface for being gripped by the user;
wherein a plurality of the layers each has a thickness of less than $1/16$th of an inch;
where multiple users are capable of using the sanitary cover which remains attached to the grip of the cart.

2. A shopping cart grip sanitary cover system, comprising:
a sanitary cover including multiple layers of a substantially similar size and shape each with a top face, a bottom face, and a periphery formed therebetween, the bottom face of each layer having adhesive formed thereon for adhering to a top face of an adjacent layer, the layers being stacked with a bottommost layer being attachable to a grip of a shopping cart via the adhesive, the shopping cart including a basket portion having a bottom and a plurality of sides coupled thereto and extending upwardly therefrom for defining an interior space for storing articles therein, a plurality of wheels coupled to the bottom of the shopping cart for transporting the shopping cart, and a handle assembly including a pair of posts with inboard ends coupled to the shopping cart, and a substantially horizontal handle coupled to outboard ends of the posts, the handle being equipped with the grip;
wherein a topmost layer of the sanitary cover is removable for exposing another layer therebeneath for providing a sanitary surface for being gripped by a user, where multiple users are capable of using the sanitary cover which remains attached to the grip of the shopping cart;
wherein a non-adhesive covering is removed from the bottom face of the bottommost layer of the sanitary cover, the non-adhesive covering being removable for attachment of the adhesive of the bottommost layer of the sanitary cover to the grip of the shopping cart;
wherein the multiple layers include non-adhesive members coupled thereto for being gripped by a user to facilitate the removal of the topmost layer of the sanitary cover;
wherein a plurality of the layers each has a thickness of less than $1/16$th of an inch.

3. The shopping cart grip sanitary cover, as recited in claim 2, wherein the layers are each flexible.

4. The shopping cart grip sanitary cover system, as recited in claim 2, wherein the layers are each formed of an elastomeric material.

5. The shopping cart grip sanitary cover system, as recited in claim 2, wherein the layers each have a rectangular configuration.

6. The shopping cart grip sanitary cover system, as recited in claim 2, wherein the layers each have an area substantially similar to an area of the grip of the shopping cart.

7. The shopping cart grip sanitary cover system, as recited in claim 2, wherein the layers are stacked so that the peripheries thereof are in alignment.

8. The shopping cart grip sanitary cover system, as recited in claim 2, and further comprising a dispensing container for storing a plurality of the sanitary covers.

9. The shopping cart grip sanitary cover system, as recited in claim 8, wherein the dispensing container includes an opening for dispensing the sanitary covers therefrom.

10. The cart grip sanitary cover as recited in claim 8, wherein the cart includes a shopping cart.

11. The shopping cart grip sanitary cover system, as recited in claim 2, wherein the bottom face of each layer has the adhesive formed on an entire surface thereof.

12. The shopping cart grip sanitary cover system, as recited in claim 11, wherein a plurality of the layers each has a thickness of less than $1/32^{nd}$ of an inch.

13. The shopping cart grip sanitary cover system, as recited in claim 12, wherein a plurality of the layers each has a thickness of less than $1/64^{th}$ of an inch.

14. A method of providing a sanitary surface on a grip of a shopping cart, comprising:
attaching a sanitary cover to a grip of a shopping cart, the sanitary cover including multiple layers of a substantially similar size and shape each with a top face, a bottom face, and a periphery formed therebetween, the bottom face of each layer having adhesive formed thereon for adhering to a top face of an adjacent layer; the layers being stacked with a bottommost layer being attachable to the grip of the shopping cart via the adhesive, the shopping cart including a basket portion having a bottom and a plurality of sides coupled thereto and extending upwardly therefrom for defining an interior space for storing articles therein, a plurality of wheels coupled to the bottom of the shopping cart for transporting the shopping cart, and a handle assembly including a pair of posts with inboard ends coupled to the shopping cart, and a substantially horizontal handle coupled to outboard ends of the posts, the handle being equipped with the grip, and
removing a topmost layer of the sanitary cover for exposing another layer therebeneath for providing a sanitary surface for being gripped by a user, where multiple users are capable of using the sanitary cover which remains attached to the grip of the shopping cart;

wherein a non-adhesive covering is removed from the bottom face of the bottommost layer of the sanitary cover, the non-adhesive covering being removable for attachment of the adhesive of the bottommost layer of the sanitary cover to the grip of the cart;

wherein the multiple layers include non-adhesive members coupled thereto for being gripped by a user to facilitate the removal of the topmost layer of the sanitary cover;

wherein a plurality of the layers each has a thickness of less than 1/16th of an inch.

15. The method as recited in claim 14, wherein the layers are each flexible.

16. The method as recited in claim 14, wherein the layers are each formed of an elastomeric material.

17. The method as recited in claim 14, wherein the layers each have a rectangular configuration.

18. The method as recited in claim 14, wherein the layers each have an area substantially similar to an area of the grip of the cart.

19. The method as recited in claim 14, wherein the layers are stacked so that the peripheries thereof are in alignment.

20. The method as recited in claim 14, and further comprising removing the sanitary cover from a dispensing container.

21. The method as recited in claim 20, wherein the dispensing container includes an opening for dispensing the sanitary covers therefrom.

22. The method as recited in claim 14, wherein the cart includes a shopping cart.

* * * * *